United States Patent
Raravi et al.

(10) Patent No.: US 10,430,860 B2
(45) Date of Patent: Oct. 1, 2019

(54) SYSTEMS AND METHODS FOR ENHANCING SHOPPING EXPERIENCE IN PHYSICAL STORES

(71) Applicant: Conduent Business Services, LLC, Dallas, TX (US)

(72) Inventors: Gurulingesh Raravi, Bangalore (IN); Shruti Kunde, Mumbai (IN); Sharanya Eswaran, Bangalore (IN); Deepthi Chander, Cochin (IN); Nimmi Rangaswamy, Medak (IN); Joydeep Banerjee, Tempe, AZ (US); Sindhu Kiranmai Ernala, Telangana (IN); Meeralakshmi Radhakrishnan, Kerala (IN); Priyanka Sharma, Rajasthan (IN)

(73) Assignee: Conduent Business Services, LLC, Florham Park, NJ (US)

(*) Notice: Subject to any disclaimer, the term of this patent is extended or adjusted under 35 U.S.C. 154(b) by 461 days.

(21) Appl. No.: 15/273,760

(22) Filed: Sep. 23, 2016

(65) Prior Publication Data

US 2018/0089736 A1    Mar. 29, 2018

(51) Int. Cl.
*G06Q 30/06* (2012.01)
*G06Q 30/02* (2012.01)
(Continued)

(52) U.S. Cl.
CPC ..... *G06Q 30/0631* (2013.01); *G06Q 30/0251* (2013.01); *G06Q 30/0255* (2013.01);
(Continued)

(58) Field of Classification Search
None
See application file for complete search history.

(56) References Cited

U.S. PATENT DOCUMENTS

| 6,611,881 B1* | 8/2003 | Gottfurcht | G06Q 20/105 710/18 |
| 9,449,288 B2* | 9/2016 | Swann | G06Q 10/02 |

(Continued)

FOREIGN PATENT DOCUMENTS

EP    2937828 A1 *    10/2015

OTHER PUBLICATIONS

Harri, S., et al., "Review of the Role of Sensors in Mobile Context-Aware Recommendation Systems, A," International Journal of Distributed Sensor Networks, vol. 2015, Article ID 489264, http://dx.doi.org/10.1155/2015/489264 (Year: 2015).*

(Continued)

*Primary Examiner* — Nicholas D Rosen
(74) *Attorney, Agent, or Firm* — Jones Robb, PLLC

(57) ABSTRACT

The present disclosure discloses methods and systems for enhancing shopping experience in physical stores. The method includes receiving at least one persona associated with a user based on one or more of: ethnographic data obtained from a user, demographic data associated with the user, buying behavioral data associated with the user, and social networking data associated with the user. After this, one or more historical activities of the user inside one or more physical stores are received. Also, one or more constraints associated with the user are received. Once received, the at least one persona, the one or more constraints, and the one or more historical activities are analyzed to generate a pre-defined number of personalized recommendations. Finally, the personalized recommendations are displayed to the user within a window of a user interface.

16 Claims, 8 Drawing Sheets

(51) Int. Cl.
*H04L 29/08* (2006.01)
*G06Q 50/00* (2012.01)

(52) U.S. Cl.
CPC ..... *G06Q 30/0257* (2013.01); *G06Q 30/0261* (2013.01); *H04L 67/22* (2013.01); *G06Q 50/01* (2013.01)

(56) References Cited

U.S. PATENT DOCUMENTS

| | | | | |
|---|---|---|---|---|
| 9,881,332 | B2* | 1/2018 | Bloem | G06Q 30/0631 |
| 9,898,772 | B1* | 2/2018 | Word | G06Q 30/0631 |
| 2006/0208070 | A1* | 9/2006 | Kato | G06O 20/203 235/383 |
| 2008/0270398 | A1 | 10/2008 | Landau et al. | |
| 2010/0125500 | A1* | 5/2010 | Beavers | G06Q 30/02 705/14.51 |
| 2012/0197726 | A1* | 8/2012 | Aggarwal | G06Q 30/02 705/14.64 |
| 2013/0041902 | A1* | 2/2013 | Swann | G06Q 10/02 707/737 |
| 2013/0326398 | A1* | 12/2013 | Zuverink | G06F 3/048 715/784 |
| 2014/0279007 | A1* | 9/2014 | Srinivasan | G06Q 30/0261 705/14.58 |
| 2014/0279197 | A1* | 9/2014 | Ainsworth, III | G06Q 30/0631 705/26.7 |
| 2014/0316930 | A1* | 10/2014 | Jain | G06F 16/9535 705/26.5 |
| 2015/0262249 | A1* | 9/2015 | Wical | G06Q 30/0269 705/14.55 |
| 2015/0310460 | A1* | 10/2015 | Tesanovic | H04W 4/029 705/7.31 |
| 2015/0339754 | A1* | 11/2015 | Bloem | G06Q 30/0631 705/26.7 |
| 2016/0026724 | A1* | 1/2016 | Ramsey | G06K 9/3233 345/633 |
| 2016/0343056 | A1* | 11/2016 | Hu | G06Q 30/0631 |
| 2017/0041300 | A1* | 2/2017 | Kim | H04L 63/0464 |
| 2017/0293866 | A1* | 10/2017 | Bender | G06Q 10/02 |

OTHER PUBLICATIONS

L. Hella and J. Krogstie, "Personalisation by Semantic Web Technology in Food Shopping," in *WIMS'11*, 2011.

T. Adlin, K. McGrane, J. Pruitt, A. Rosenstein and K. Goodwin, "Putting Personas to Work," in *CHI'06*, Montreal, 2006.

G. Getto and K. S. Amant, "Designing Globally, Working Locally: Using Personas to Develop Online Communication Products for International Users," *Communication Design*, 2014.

Toshniwal, Shubham, et al. "USHER: An Intelligent Tour Companion." Proceedings of the 20th International Conference on Intelligent User Interfaces Companion. ACM, 2015.

Wang, He, et al. "No need to war-drive: unsupervised indoor localization." In Proc. of Mobisys 2012.

Bao, Jie, Yu Zheng, and Mohamed F. Mokbel. "Location-based and preference-aware recommendation using sparse geo-social networking data." Proceedings of the 20th International Conference on Advances in Geographic Information Systems. ACM, 2012.

Yin, Hongzhi, et al. "Lcars: A location-content-aware recommender system." Proceedings of the 19th ACM SIGKDD international conference on Knowledge discovery and data mining. ACM, 2013.

Muralidharan, Kartik, et al. "myDeal: a mobile shopping assistant matching user preferences to promotions." Proceedings of the 11th International Conference on Mobile and Ubiquitous Systems: Computing, Networking and Services. ICST (Institute for Computer Sciences, Social-Informatics and Telecommunications Engineering), 2014.

Lee, SangJeong, et al. "Understanding customer malling behavior in an urban shopping mall using smartphones." In Proc. Ubicomp 2013 adjunct publication.

Sieg, Ahu, Bamshad Mobasher, and Robin Burke. "Web search personalization with ontological user profiles." *P roceedings of the sixteenth ACM conference on Conference on information and knowledge management*. ACM, 2007.

Park, Moon-Hee, Jin-Hyuk Hong, and Sung-Bae Cho. "Location-based recommendation system using Bayesian user's preference model in mobile devices." Ubiquitous Intelligence and Computing. Springer Berlin Heidelberg, 2007. 1130-1139.

Zeng, Yunze, et al. "Analyzing Shopper's Behavior through WiFi Signals." WPA 2015.

\* cited by examiner

| LEVELS | PARAMETER 1 | PARAMETER 2 | PARAMETER 3 | PARAMETER 4 | PARAMETER 5 |
|---|---|---|---|---|---|
| LEVEL 1 (L1): GENERAL SHOPPING BEHAVIOUR | BUDGET | NEED | BRAND | CONVENIENCE | TRUST |
| L2: PRODUCT AESTHETICS | COLOUR | TEXTURE/WEIGHT | APPEAL | COMFORT | QUALITY |
| L3: NEGOTIATION | SALE/DISCOUNTS/ ONLINE SHOPPING FESTIVALS | COUPONS/ DISCOUNT VOUCHERS | MODE OF PAYMENT | PayU/PayBack POINTS, MEMBERSHIP CARDS | BARGAIN/NOT BARGAIN |
| L4: NICHE | HANDMADE | HIGH END | MEDIA INFLUENCE | USED PRODUCTS | NICHE (ON SALE/ONLINE) |

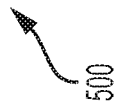

FIG. 5

| SENSOR | INSIGHTS PROVIDED |
|---|---|
| ACCELEROMETER (FROM PHONE OR WATCH) | WALKING SPEED, TRAJECTORY, QUEUING |
| MAGNETOMETER (FROM PHONE OR WATCH) | WALKING TRAJECTORY, TURNS, LOCATION |
| AUDIO (FROM PHONE OR WATCH) | AMBIENT NOISE, CROWD, TIME OF DAY |
| GYROSCOPE (FROM WATCH) | HAND MOVEMENTS SUCH AS PICKS, PUSHING AND TURNING CART, ETC. |
| BATTERY TEMPERATURE (FROM WATCH) | AMBIENT TEMPERATURE, LOCATION SUCH AS IS HE IN THE FREEZER SECTION. |
| BLE BEACONS (ALONG WITH A PHONE TO RECEIVE THESE SIGNALS) | PROXIMITY WITH RESPECT TO THE LOCATION OF THE BEACONS, I.E., SHOPPER INTERACTED WITH PRODUCT TYPE A AT TIME T, ETC. |

FIG. 6

SYSTEMS AND METHODS FOR ENHANCING SHOPPING EXPERIENCE IN PHYSICAL STORES

TECHNICAL FIELD

The present subject matter, in general, relates to recommendation systems, and more particularly to systems and methods for enhancing shopping experience of users in physical stores.

BACKGROUND

Recommendation system is a very common and important component of e-commerce platforms. As well known, recommendation systems (sometimes replacing "system" with a synonym such as platform or engine) belong to a subclass of information filtering systems that seek to predict the rating or preference that a user wants give to an item/product. The recommendation system functions to select and then recommend items to the user. Few examples of the items include consumer products (e.g., books, personal computers, or other consumer goods), entertainment content (e.g., music, movies, and TV programs), news stories, web pages, publications, services, applications or the like. To this end, the recommendation system may use filtering techniques that attempt to enable the system to select items that are likely to be of interest to the user. Sometimes, the recommendation system compares a user's profile to some reference characteristics and seeks to predict a rating that the user may want to give to an item the user has not yet rated. These characteristics may be based on the information item (content-based approach) or the user's social environment (collaborative filtering approach). Such recommendation systems are now commonly used in retail arena.

Current trends in the retail arena focus heavily on the users/consumers shopping experience. Retailers compete in the market for expanding their consumer base and this competition is primarily achieved by providing competitive prices, deals and discounts to their users. This information can often be overwhelming for the users and may sometimes become difficult for him or her to select a set of items.

While some work in the domain exists for providing recommendations to the users in order to assist them while shopping. Most recommendation systems today take into account the users shopping history and profile details when making recommendations. Mostly the efforts are centered on online retail outlets and further not much attention is paid to personalization and assistance to the users with respect to physical stores. In fact, physical stores are also finding it difficult to retain their users/customers due to the ever increasing competition from the online stores. One of the key reasons is the lack of personalized shopping experience offered by the physical stores. In view of the foregoing described needs, the present disclosure provides methods and systems for enhancing shopping experience of users in physical stores.

SUMMARY

According to one embodiment, a system for presenting personalized shopping related recommendations to one or more users, the shopping recommendations related to one or more physical stores is disclosed. The system comprises a processor, and a memory coupled to the processor for executing a plurality of modules present in the memory. The plurality of modules comprises a receiving module, a recommendation engine, and a user interface. The receiving module is configured to receive one or more items to buy and at least one constraint associated with a user, the constraint being specified by the user; at least one persona associated with the user; and at least one activity associated with the user in one or more physical stores, the activity being tracked using one or more smart devices. The recommendation engine is configured to process the at least one constraint, the at least one persona, and the at least one activity and to generate a selectable ranked set of the personalized recommendations for the user. The user interface is configured to display the selectable ranked set of the personalized recommendations to the user.

According to another embodiment, an apparatus is disclosed. The apparatus comprises one or more non-transitory computer readable mediums storing a persona learning unit, a data collection unit and a recommendation engine. The persona learning unit is configured to receive one or more of: ethnographic data related to a user, demographic data associated with the user, behavioral data associated with the user, social networking data associated with the user; generate one or more personas of the user based on one or more of: the ethnographic data related to the user, the demographic data associated with the user, the buying behavioral data associated with the user, the social networking data associated with the user; and classify the user into a pre-defined persona bucket and represent the persona in a form of a matrix representation. The data collection unit is configured to obtain the one or more personas associated with the user, one or more constraints associated with the user and an activity data of the user, the activity data sensed using one or more smart devices. The recommendation engine is configured to process the one or more personas of the user, the one or more constraints of the user and the activity data of the user to generate a pre-defined number of personalized recommendations for the user; and send a notification of the personalized recommendations to the user.

According to further embodiment, a method for assisting users by presenting recommendations for shopping at physical stores is disclosed. The method comprises receiving at least one persona associated with a user based on one or more of: ethnographic data obtained from a user, demographic data associated with the user, buying behavioral data associated with the user, and social networking data associated with the user; receiving one or more constraints associated with the user, the constraints are specified by the user and include one or more of: a time constraint, a budget constraint, a distance constraint, an item to buy constraint, and a location constraint; receiving one or more historical activities of the user inside one or more physical stores; analyzing the at least one persona, the one or more constraints and the one or more historical activities, to generate a pre-defined number of personalized recommendations; and displaying the personalized recommendations to the user within a window of a user interface.

According to an additional embodiment, a personalized recommendation system for providing presenting physical store shopping related recommendations to one or more users is disclosed. The recommendation system comprises an electronic device, being operated by a user, adapted to transmit at least one constraint, the constraint comprises an intent to shop, and at least one recommendation engine adapted to generate a selectable ranked set of the personalized recommendations for the user and transmit the selectable ranked set of the personalized recommendations to the electronic device. The selectable ranked set of the personalized recommendations are generated based on the at least one constraint transmitted, one or more historical activities of the user, and at least one persona generated associated with a user. The selectable ranked set of the personalized recommendations are displayed on the user interface of the electronic device.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 5 illustrates an exemplary table capturing various shopping related parameters.

FIG. 6 illustrates a table indicating exemplary sensors and corresponding insights.

DESCRIPTION

Figure 1:
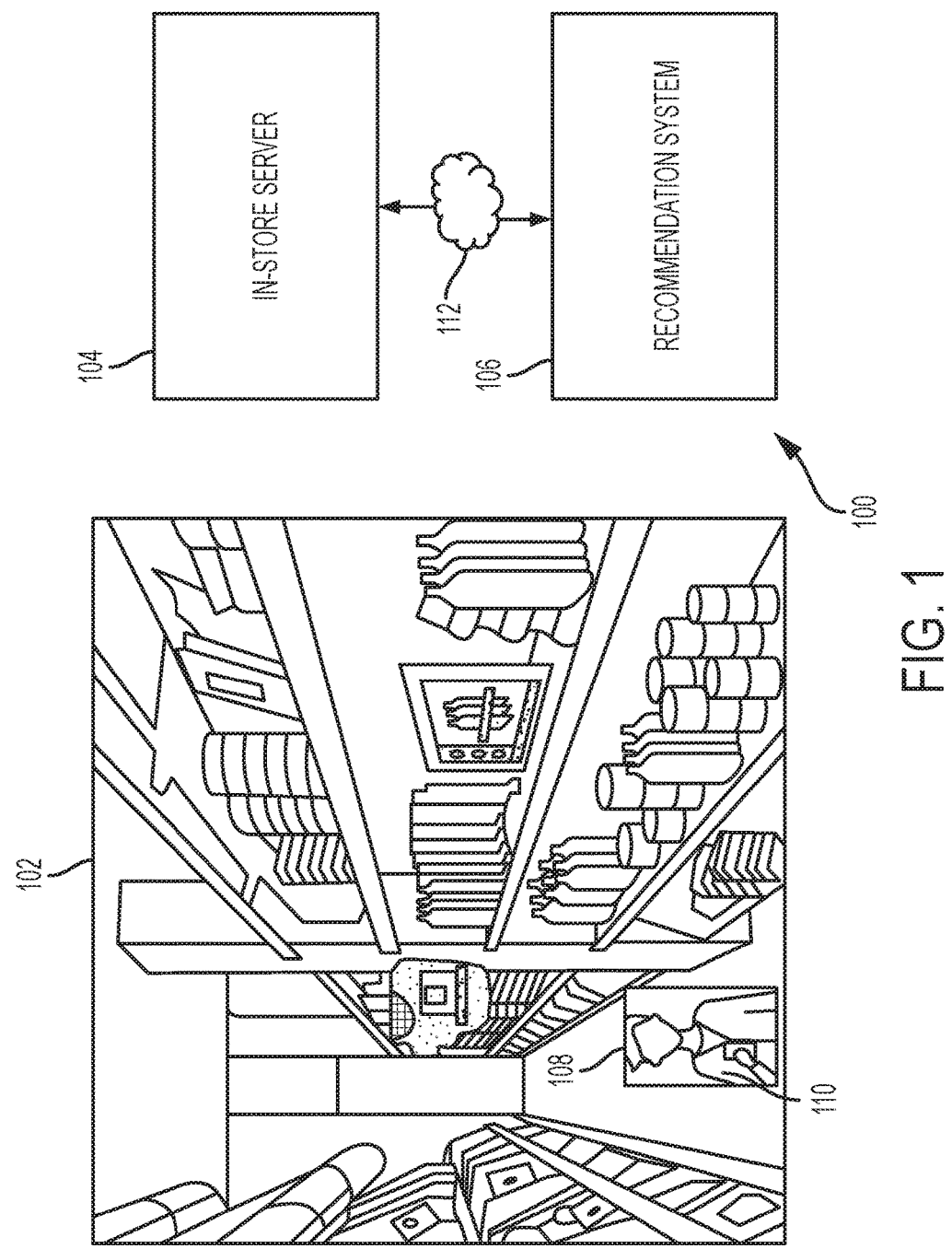
FIG. 1 illustrates an exemplary environment in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity, and are intended to include more examples than just provided below.

In various embodiments of the present disclosure, definitions of one or more terms that will be used in the document are described below. The term "recommendations" is defined to include one or more shopping related suggestions for a user in the context of a physical store (also known as brick and mortar store). The recommendations relate to shopping such as a route to a shopping store, items to buy within the store, and so on. The system providing such recommendations to the user is referred to as a "recommendation engine" or a "recommendation system" or a "recommendation server". The term "persona" indicates information about a user—may be in terms of likes, dislikes, habits, behavior, preferences, etc. The "persona" may also be referred to as a profile of the user. The term "activity" generally refers to an activity being performed by a user inside a physical store. Few non-limiting examples of such activities include—picking up items, moving inside the store, etc. The term "constraint" refers to any limitation that a user may have while doing shopping. The "constraint" may be in the form of time, budget, distance, and so on. The phrase "user" refers to any person who wishes to buy one or more items from a physical store. In the context of the current disclosure, the "user" wishes to receive personalized recommendations based on the persona, activity and constraint information. Sometimes, the "user" may interchangeably be used with the phrase "shopper" or "consumer."

Overview

Most recommendation systems available today take into account users shopping history and profile details. Therefore, the systems end-up providing similar recommendations to different users having similar details. However, two different users may have different behaviors and thus, need not get the same recommendation. In light of this, methods and systems of the present disclosure provide personalized and context aware recommendations to users. More particularly, the disclosure utilizes multiple sources of information including persona, constraints, and activity to make recommendations. The multiple sources assist in providing far more relevant recommendations to the users as opposed to existing solutions. Also, the disclosure provides different recommendations to users having different personas and thus assist them make a better decision.

Exemplary Environment

FIG. 1 discloses an exemplary environment 100 in which various embodiments of the disclosure can be practiced. The environment 100 is shown to include a physical store 102, an in-store server 104, a recommendation server/system 106 and a user 108 carrying a mobile device 110. The in-store server 104 is communicatively coupled to the recommendation server 106 via a network 112. The network 112 also couples the mobile device 110 to the recommendation server 106.

As shown, the user 108 visits the store 102 to buy products or items of his or her choice. Few examples of the physical store 102 may include, but not limited to, grocery shopping store, fashion shopping store and so on. Further, the store 102 may be specific for a product such as grocery, or may also have all products related to grocery, clothing, shoes, fashion, accessory, electronics, etc. Each time the user 108 buys an item from the store 102, the in-store server 104 maintains a record of items purchased by the user 108, details of the user 108, details of the shopping, details of the store 102 and so on. In this manner, the in-store server 104 maintains shopping history of the user 108. The history includes his or her shopping preferences, habits, behavior etc. Other than this, the in-store server 104 maintains all records related to the products in the store 102 such as bar code details, availability, number of items, discounts available, deals, etc.

To assist the user 108 for shopping, the present disclosure introduces the recommendation system 106 (recommendation server 106). One aim of the recommendation system 106 is to provide recommendations such that gap between online and physical retail is bridged. This is achieved by defining personas having features applicable to both the online and physical retail stores. The recommendation system 106 provides personalized recommendations to the user 108 while for doing shopping at the physical store 102 (i.e., offline shopping). The recommendations may relate to optimal routes to the store 102, details of the store 102, items to be shopped in the store 102 or the like.

The system 106 takes input from multiple sources—(i) persona, (ii) directly from the user 108 (i.e., constraint information), and/or historical activity data associated with the user sensed from smart devices (i.e., historical real-time activity inside the store 102). In an embodiment, the smart devices may be carried by the user 108, for example, mobile device 110. While in another embodiment, the smart devices may be a part of the store 102. Various examples of the smart devices may include cell phones, wearable devices including watches, headsets, etc., cameras, or other types of sensors installed inside the store 102. The personalized recommendations provided by the recommendation system 106 makes it convenient for the user 108 to plan his or her shopping across multiple stores according to his or her needs, constraints and persona.

In one embodiment, the recommendation system 106 receives constraint information from the user 108 via the mobile device 110. In one embodiment, the recommendation server 106 receives activity information (i.e., historical real-time activity/data information associated with the user) captured using the mobile device 110 of the user 108, the mobile device 110 may capture activities of the user 108 inside the store 102. Other than the mobile device 110, the activity information may be captured using any device of the user 108 such as a laptop computer, a PDA, a notebook, a smart watch and so on. In one embodiment, the persona may be received from the in-store server 104. In an embodiment, the in-store server 104 maintains the persona details of the user 108 in a pre-defined format. In some embodiments, the complete persona information may be received from the in-store server 104. In alternate embodiments, the persona of the user may be maintained or pre-stored with the recommendation system 106.

In one embodiment, the persona information of the user 108 is pre-stored in the recommendation system 106 which is retrieved based on the user's previous shopping data or ethnography study of the user 108. In case the persona information is not available with the recommendation system 106, the recommendation system 106 learns the persona of the user 108 over a period of time and during this time, the persona information is stored in the recommendation system 106 and is continuously updated based on the learning's.

As shown, the recommendation system 106 may be a part of the in-store server 104 and thus may form an integrated system. While in other embodiments, the recommendation system 106 may be a separate entity from the in-store server 104. In some embodiments, the recommendation server 106 may be deployed in the form of an app, a website or a combination of these.

In one implementation, the in-store server 104, and the recommendation server 106 are connected over the network 112. The network 112 may be a wireless network, a wired network or a combination thereof. The network 112 may be implemented as one of the different types of networks, such as intranet, Local Area Network (LAN), Wide Area Network (WAN), the Internet, and the like. The network 112 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 112 may include a variety of network devices, including routers, bridges, servers, computing devices, storage devices, and the like.

Exemplary Flow Diagram

Figure 2:
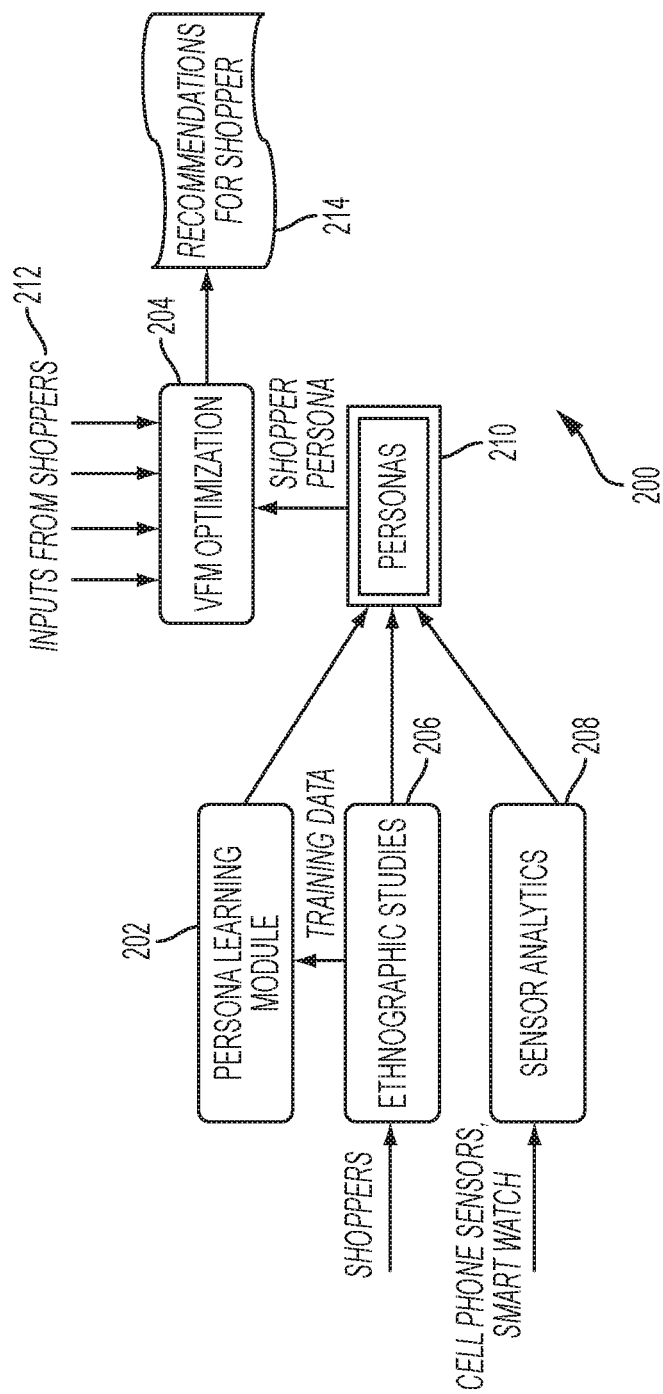
FIG. 2 illustrates an exemplary flow diagram for providing personalized recommendations to users.

FIG. 2 shows an exemplary flow diagram 200 depicting various types of inputs, i.e., ethnographic study data, sensor data and user inputs taken for providing recommendations. The diagram 200 further shows a persona learning module 202, and a recommendation engine (a Value for Money optimization engine) 204. Typically, shopping experience is a subjective topic as it depends on several factors such as shopper's persona, nature of the store, a list of items the shopper wishes to buy, or the like. To address this, the recommendation engine 204 uses the real-world data as well as simulated data. For example, the recommendation engine 204 uses data collected via conducting an ethnographic study (marked as 206) and data collected using sensors (marked as 208) to understand shopping behavior/habits/traits of the user. The collected data is analyzed to create a relevant persona (marked as 210) for the user and thereby the persona is used to provide personalized recommendations to the user. Along with this, the recommendation engine 204 uses additional input information—constraint information (marked as 212) of the user to provide personalized recommendations 214 to the user. More details on various inputs are provided below.

In one embodiment, the constraints received from the user, persona received and the sensed data from previous shopping visits are considered while making recommendations. In one example, the persona provides the input in the form of, if the user is an infrequent shopper (e.g., need based shopping) or a luxuriant shopper (e.g., brand conscious shopper), or if the user has any orientation towards particular brands, or which stores do the user prefer, or the general behavior of the user in shop (explores things or sticks to the items of interest, etc.), etc. The data sensed during the previous shopping outings are used to evolve/refine the user persona and also to provide the recommendations for the next time. The data sensed during the shopping exercise is used for making better recommendations next time to the user based on the shopping experience (good/bad) of the user in a particular shop or a set of shops, items the shopper explored during the shopping exercise, etc.

In one embodiment, for algorithmic purpose, the persona is modeled as a set of features with different weights being assigned. In one example, some example of features may include but not limited to brand consciousness, product popularity, media influence, promotions, etc.

In one embodiment, a mechanism to model a shopper's persona using similarity scoring is developed. For a shopper, for each product listed (for purchasing) in his/her query, a score is computed. The score of a product is generally different for shoppers with different personas. For example, the score for a high-end wrist watch in a store may be higher for a luxuriant shopper compared to that of an infrequent shopper.

In another embodiment, the similarity scores computed to model the shopper's persona is as follows: Each user is characterized with a set of features. The feature identification is done using demographic studies for several human subjects followed by quantification of the feature values. The data is used to classify between different kinds of shoppers (e.g., luxuriant and infrequent shoppers). The classification results are used to generate weights for different identified features (e.g., brand consciousness, product popularity, media influence, promotions, etc.) pertaining to different persona class. The weight signifies the importance of a feature to a specific persona label. For any given queried product, the matched products are quantified for the features (as discussed earlier). With the feature values and the corresponding quantified value for the product, the similarity score for the product at a retail store for a user with a persona is computed.

It is to be noted that there may be better ways to compute these similarity scores (to model the persona). Moreover, the categories of personas are not restricted to only luxuriant and infrequent. Hence, although the proposed recommendation solutions are dependent on the similarity scores, the working of the solutions according to the present disclosure is independent of it. Any persona modeling which can generate such similarity scores can be incorporated into the solutions according to the present disclosure.

Ethnography Study (206)

A real-world study (i.e., ethnographic study) is conducted with different users or shoppers to understand their shopping traits, behaviors, and/or experiences. The study is conducted by visiting malls, shopping outlets, personal and contextual interviews inside the malls, photograph diaries and so on. The data is gathered from actual shoppers in the physical world. The data is fed to the persona learning module 202 to identify different personas for different users.

Sensor Analytics (208)

Here, understanding the shopper's experience is an important aspect for providing recommendations about the stores. To this end, the disclosure introduces data gathered using smart devices such as cell phones, watches or any other kind of wearables of the user or a combination of these. These devices are typically carried by the user and are used to get insights into the shopping behavior inside the store. The devices capture interaction of the user with individual items or overall shopping episode inside the store. In particular, the devices have inbuilt sensors to monitor activities of the user. For example, the sensors capture various features of shopping experience such as, how crowded the shop is, how much time is spent in which part of the shop, how many items are purchased, how frequently the user shops, if the user visits the same shop regularly, etc. Few other examples include—picking up an item, putting an item in trolley, putting an item back in the aisle. Such continuous tracking of shopping episodes over time helps understand the persona of the user and his preferences thereby building a customized shopping persona.

In an example, the smart devices may include devices which are typically carried by the user to capture activities inside the store. While in another example, the smart devices may also include devices which are a part of the store and few such non-limiting examples may include cameras, Bluetooth beacons, RFID devices or any other kind of sensors installed in the store. The activities tracked by the smart devices may be the locomotive activities, physical movement, or gestural activities of the user.

Persona Generation

The persona 210 indicates description of users/shoppers constructed from understanding data from real people. For example, a persona provides information pertaining to shoppers' likes, dislikes, preferences, lifestyles, culture driven behaviors and so on and further enables classification of the shoppers in different categories. The persona 210 is utilized in predicting relevant personalized recommendations. Further, the persona may evolve over time as preferences of the user may change based on demographics (such as age, income) or circumstances. The persona 210 is dynamic in nature and continues to evolve over a period of time. In order to capture the evolving persona, the persona learning module 202 continuously learns about the shopper traits/behaviors and accordingly classifies the user in the most relevant category. Besides this, the persona learning module 202 also incorporates new users.

The data collected through the ethnographic study 206 and sensor analytics 208 is used to provide relevant and personalized recommendations to the user. As above, the data gathered using the ethnographic study 206 and sensors is consolidated to determine various behavioral characteristics of the user and identify user persona. The data collected through the ethnographic study and from the sensors analytics is analyzed to create relevant user's personas that ultimately enable the engine 204 to provide personalized recommendations to the user.

The persona 210 may be defined in the form of a matrix representation. The matrix representation helps understand the user behavior and identify the user persona. The persona is provided to the persona learning model 202 to learn the personas over time given continuously collected data. One example of matrix representations, preferably is a cubic matrix representation. The six faces of a cuboid represent different product categories, each providing details at various levels in terms of the general features of a product. The matrix may provide a qualitative and a quantitative view of the persona and enables categorization of users based on their shopping habits.

The persona building is considered across different dimensions (i.e., six product categories) combined together to form one persona coupled with consideration of variables (like need, sensory aesthetics, media influence). Referring to FIG. 5, a table 500 indicates different parameters captured to form personas of the user. These parameters are categorized into different levels. The inputs may be used for creating personas. Examples of those six categories include fashion, electronics, household, furniture, groceries and others.

Based on the study and analysis performed above, the user may be categorized into appropriate persona bucket. The persona bucket may include three types of users such as luxuriant, infrequent and impromptu shoppers. For example, a luxuriant shopper is the one who generally looks for products of high-end brands, while an infrequent shopper is the one who generally is a needy shopper and buys only products which are under sales and thus, prefers to wait for the sales season. Impromptu shoppers are the ones who buys items as and when they like.

In some embodiments, social networking information of the user, buying behavior of the user, demographic information and others are considering while generating personas. This set of information may be collected from the user or from the third party servers.

Input from the Shopper 210

Once generated, the persona 210 of the user is fed to the engine 204 for providing recommendations. Along with this, the engine 204 also receives inputs from the user 212, the input may be in the form of constraints. The constraints are in the form of money, distance, location, time, or a combination of these.

Recommendation Engine 204

The recommendation engine 204 processes the received information and outputs one or more relevant and personalized recommendations (marked as 214) for the user. Thereafter, feedback from the user is obtained to determine if the user is satisfied with the choices recommended by the engine 204 and accordingly the engine 204 incorporates the feedback when providing future recommendations.

Exemplary Recommendation System

Figure 3:
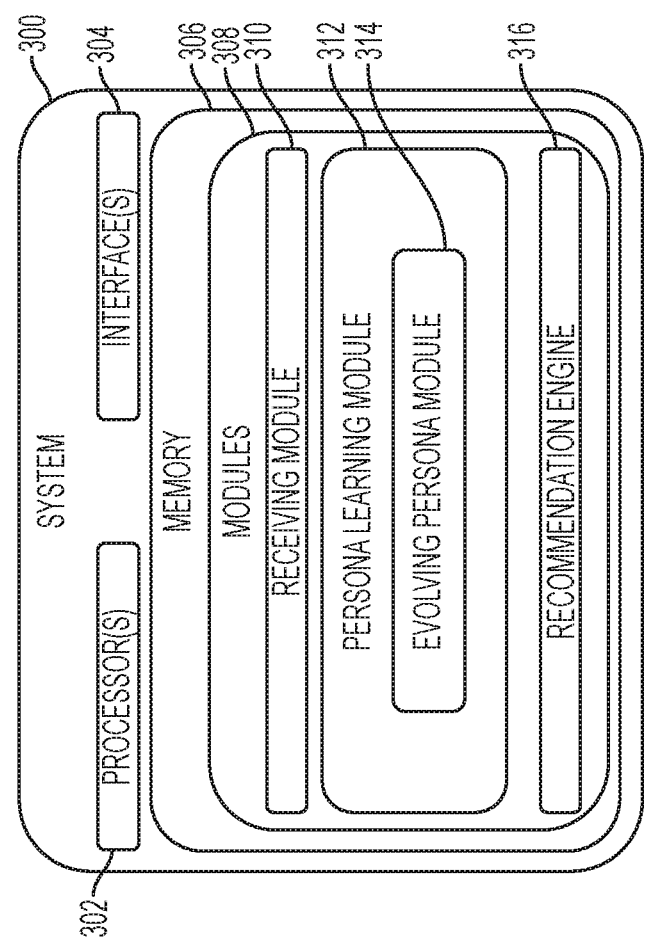
FIG. 3 shows an overall system including various components, for providing personalized recommendations to users for physical stores.

FIG. 3 shows an exemplary recommendation system 300 for providing shopping related recommendations to one or more users. As shown, the system 300 includes at least one processor 302, an input/output (I/O) 304 (user interface), and a memory 306. The at least one processor 302 may be implemented as one or more microprocessors, microcomputers, microcontrollers, digital signal processors, central processing units, state machines, logic circuitries, and/or any devices that manipulate signals based on operational instructions. The at least one processor 302 is configured to fetch and execute computer-readable instructions stored in the memory 306.

The I/O interface 304 may include a variety of software and hardware interfaces, for example, a web interface, a graphical user interface, and the like. The I/O interface 304 may allow the system 300 to interact with a user directly or through the user devices (the user device 110 for example). Further, the I/O interface 304 may enable the system 300 to communicate with other computing devices, such as web servers and external data servers (not shown). The I/O 304 may facilitate multiple communications within a wide variety of networks and protocol types, including wired networks, for example, LAN, cable, etc., and wireless networks, such as WLAN, cellular, or satellite. The I/O interface 304 may include one or more ports for connecting a number of devices to one another or to another server.

The memory 306 may include any computer-readable medium known in the art including, for example, volatile memory, such as Static Random Access Memory (SRAM) and Dynamic Random Access Memory (DRAM), and/or non-volatile memory, such as Read Only Memory (ROM), erasable programmable ROM, flash memories, hard disks, optical disks, and magnetic tapes. The memory 306 may include one or more modules 308 and data (not shown).

The modules 308 include routines, programs, objects, components, data structures, etc., which perform particular tasks or implement particular abstract data types. In the context of the present disclosure, the modules 308 include a receiving module 310, a persona learning module 312, an evolving persona module 314 and a recommendation engine 316. Each of the modules is coupled to each other via a suitable communication protocols or protocols developed later.

The receiving module 310 receives inputs from multiples sources in the form of a persona associated with the user, a historical real-time activity associated with the user tracked (sensed from multiple smart devices), and one or more constraints associated with the user.

In one embodiment, the sensor data is mainly collected/captured at the time when the user is doing shopping. However, data sensed during previous shopping events may also be used to derive/learn more about shopping persona of the shopper.

The recommendation engine 316 receives the persona and the constraints associated with the user. The recommendation engine 316 processes the persona and the constraints to generate a selectable ranked set of the personalized recommendations for the user. If the historical data of the real-time activity of the user sensed while shopping is available, such historical data of the real-time activity is also used to evolve or update the persona. The selectable ranked set of the personalized recommendations are displayed within a window of the user interface. The set of the personalized recommendations may include, but not limited, details or a notification of a route, a store for shopping, at least an item to be shopped or any combination thereof.

In one embodiment, the recommendation engine 316 makes the recommendations offline, i.e., for example, when a user on his route to home from office, and queries the system about items to buy and specifies constraints; then the recommendation engine 316 makes multiple recommendations. Once the user selects one of the recommended options (which are generally done before reaching a store) then the real-time activity/sensing tracking is performed.

In one embodiment, it may be noted that it is not mandate to select the recommended option before the user visits the store, however, if user provides that information (recommended option), it will only help the tool to make better recommendations next time.

In one embodiment, the recommendations are a ranked set i.e., the recommendations may be arranged in a pre-defined order. In one example, the recommendations may be arranged based on a rating of the store, as per the ascending order or the descending order. In another example, the recommendations may be arranged based on the distance of the store form the user current position as per the ascending order or the descending order.

In one example, the recommendations are sorted in the descending order of the recommendations that matches with the shopper's persona, i.e., the recommendations that has the highest match to the persona is provided first and then the second highest and so on.

In one implementation, a similarity score is associated with each item in each store that differs from individual to individual depending on shopper's persona, so the sorting of the recommendations based on closest match to the persona in turn boils down to which recommendation has a larger sum of cumulative similarity scores.

The recommendations are selectable, i.e., the user may select a recommendation from the list and based on the user selection, the engine 316 may navigate or guide the shopper to the selection point. The recommendation selection is then sent as feedback to the recommendation engine 316 to evolve and make a better decision next time.

Further, the recommendation engine 316 provides multiple options to the user and gives flexibility to choose one from the list. The recommendation engine 316 itself may continuously learn more about the persona of the user by observing the options selected by the user from the list of recommendations.

In one embodiment, the personalized recommendations may be shared with the user in the form of notifications, messages, and email, etc.

In one embodiment, the recommendation engine 316 may use a non-polynomial time-complexity optimal dynamic program and a polynomial time-complexity non-optimal heuristic for making recommendations. The technique of non-polynomial time-complexity optimal dynamic program and a polynomial time-complexity non-optimal heuristic for making recommendations is known in the art and thus, can be referred to. In another embodiment, the recommendation engine 316 may use an optimal recommendation algorithm for providing recommendations to the user. The optimal recommendation algorithm is again disclosed in the art and thus, can be referred to.

In one embodiment, the recommendation engine 316 may use algorithms such as dynamic programming, shortest path computation and multiple-choice knapsack problem, and the like for making recommendations.

It is to be understood that the non-polynomial time-complexity optimal dynamic program and a polynomial time-complexity non-optimal heuristic for making recommendations, and the optimal recommendation algorithm are provided for understanding purposes. A person skilled in the art should understand that any such existing and new mechanism may be implemented to provide recommendations and to build personas keeping the underlying scope of the disclosure.

The persona associated with the user is received from the persona learning module 312. The persona learning module 312 generates one or more personas based on at least one of: the ethnographic data, or a demographic data associated with the user, a buying behavioral data associated with the user, or social networking data associated with the user, or any combination thereof.

The persona learning module 312 receives an input from multiple sources in the form of: the ethnographic data, the demographic data associated with the user, the behavioral data associated with the user, the social networking data associated with the user, or any combination thereof. On receipt of the input from multiple sources, the persona learning module 312 classifies the user into a persona selected from at least one pre-defined category of the persona buckets and further represent the persona in a form of a matrix representation. Examples of the persona buckets include luxuriant, infrequent and impromptu shoppers. Also, a persona corresponds to a product and the user has different personas for different categories.

Considering shopping behaviour of the user is a dynamically evolving phenomena and is significantly modified by changes in demographic and behavioural variables. Hence it becomes imperative to capture those changes in the persona and perform re-classification. In order to capture these evolving personas, the system 300 includes the module 314, which continuously learns about the user traits and accordingly classifies the user in the most relevant categories.

To this end, the persona learning module 312 further includes the evolving persona module 314. The evolving persona module 314 is configured to update the matrix representation associated with the user based on change in at least one of: the ethnographic data, the demographic data associated with the user, the buying behavioral data associated with the user, or social networking data associated with the user, or at least a selection of the recommendation by the user from the personalized recommendations, or any combination thereof.

Figure 4:
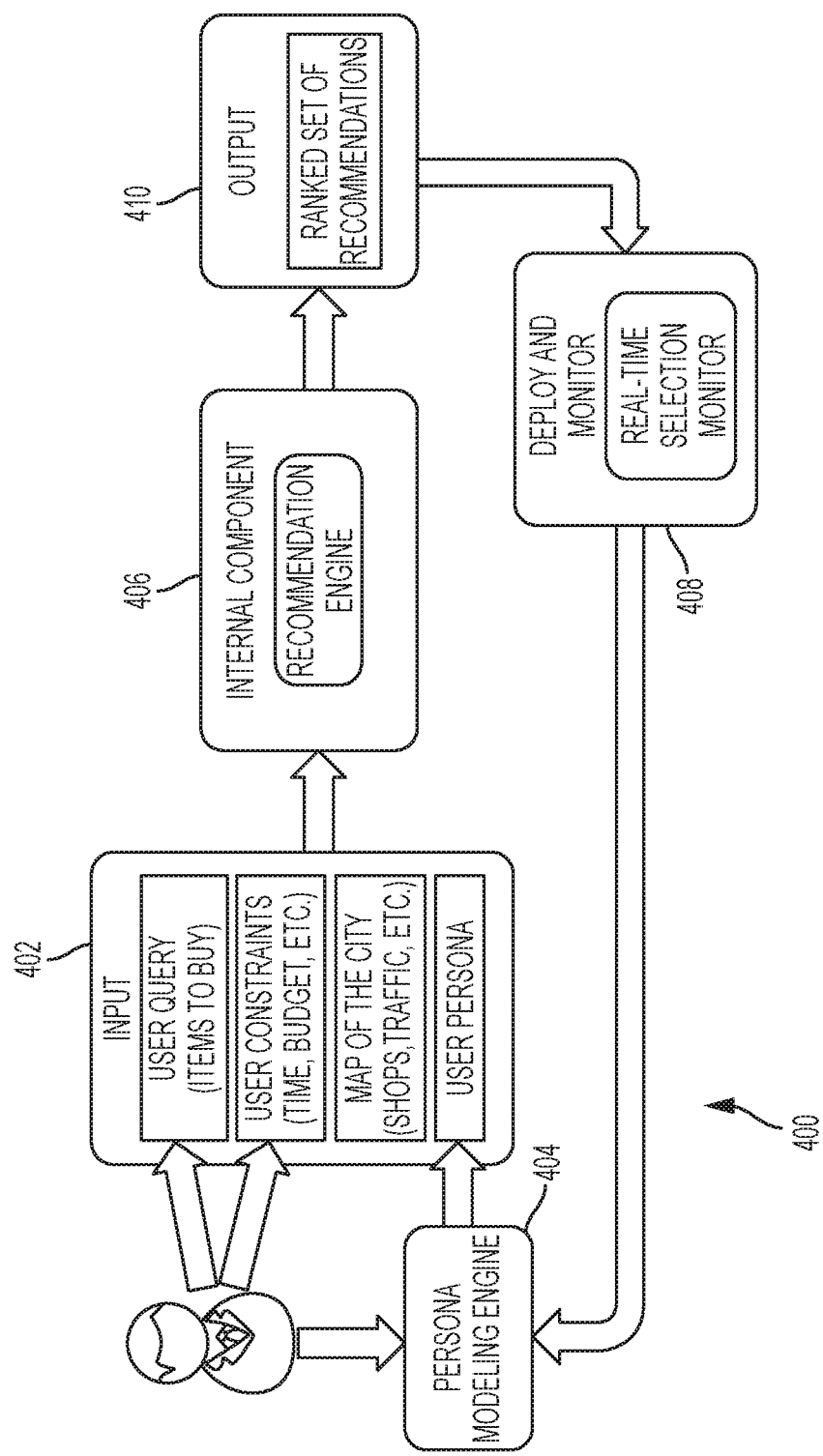
FIG. 4 shows an exemplary interactive flow diagram for providing shopping recommendations to users.

FIG. 4 illustrates an exemplary flow diagram 400 according to an embodiment of the disclosure. As shown, a user provides input 402 in the form of a query—items to buy, constraint information—time, budget, etc. To build the persona of the user, a personal modeling engine 404 takes into account real-time activity monitoring and other inputs. The input 402 is transmitted to a recommendation engine 406. The recommendation engine 406 generates recommendation for the user or generates output 410 in the ranked set of recommendations 410. The recommendations selected by the user are provided as input to deploy and monitor system 408 and then transmitted to persona modeling engine 404 to evolve the persona of the user.

Referring to FIG. 6, various types of sensors and corresponding insights captured by those are shown in the table 600. For example, accelerometer sensor may capture walking speed, trajectory and queuing. The gyroscope may capture hand movements such as picking, pushing, turning, etc. Similarly, other sensors and corresponding insights are shown in the table 600.

Exemplary Persona Generation Flowchart

Figure 7:
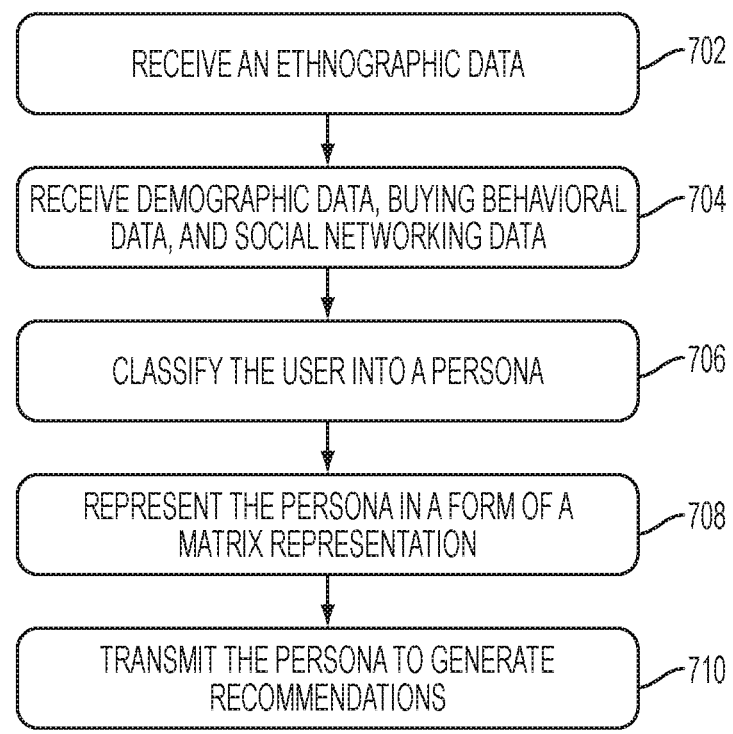
FIG. 7 illustrates a method for generating personas for users, according to an embodiment.

FIG. 7 illustrates a method for generating personas, the persona being used for generating recommendations for users. The personas may be generated by the persona learning module 312, the persona modeling engine 404 or a combination of these.

At block 702, an ethnographic data is received by the modules 312 or 404. The ethnographic data may be received by conducting interviews with multiple users.

At block 704, a demographic data associated with a user, a behavioral data associated with the user, a social networking data associated with the user is received. The data is received by the modules 312 or 404. In an embodiment, the demographic and behavioral data may be input by the user, while the social networking data may be collected using social networking websites. In another embodiment, the demographic data, behavioral data and social networking data may be received via third party systems.

At block 706, based on the above data, the user is classified into the persona. Each persona corresponds to different product categories. The persona generated is represented in a form of a matrix representation at block 708.

At block 710, the persona is transmitted to the recommendation engine 112, 316 and 406. The recommendation engine uses the persona data for providing one or more personalized recommendations to the user.

Exemplary Recommendation Flowchart

Figure 8:
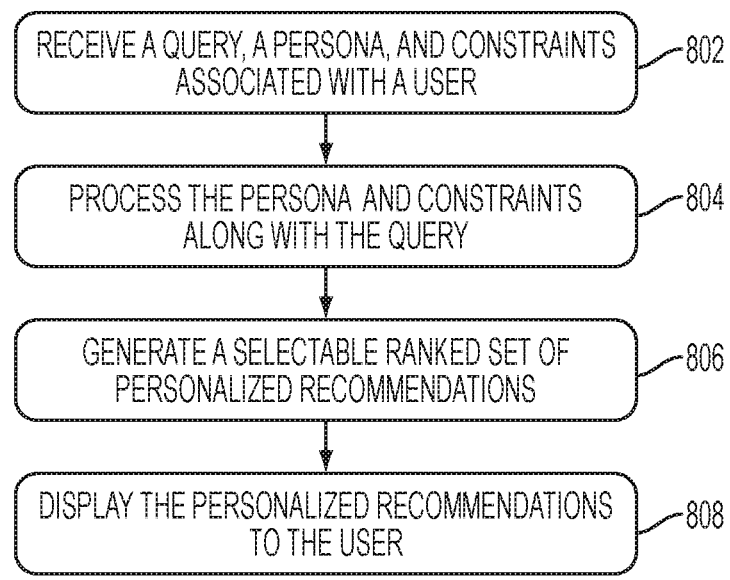
FIG. 8 illustrates a method for providing personalized recommendations to one or more users.

FIG. 8 illustrates a method flowchart for providing personalized recommendations, the recommendations are done offline. The personalized recommendations may be implemented by a recommendation system, the system may be in the form of a server. In alternate scenario, the system may be in the form of an electronic device such as a smart phone or the like.

Initially, the user inputs a query including details about an item to buy.

At block 802, at least one persona, the activity information (at least one a historical real-time activity of the user, if any), and at least one constraint associated with the user is received. In an embodiment, the persona may be evolved based on the activity details of the user to make better recommendations. The persona may be generated based on at least one of: the ethnographic data, the demographic data associated with the user, the buying behavioral data associated with the user, social networking data associated with the user, one or more historical real-time activities of the user inside one or more physical stores or a combination of these.

In one embodiment, the activity associated with the user is received from one or more smart devices associated with the user. The smart devices are the ones which the user typically carry or wearing. In other embodiment, the smart devices may include device infrastructure of the in-store such as cameras installed in the store or the like.

In one embodiment, the constraints are received from the user such as: a time constraint, a budget constraint, a distance constraint, a location constraint, or any combination thereof.

Based on the received information, the user is classified into a persona bucket, indicating what kind of user he or she is. The persona may be represented in the form of a matrix representation. The matrix representation associated with the user may be updated on time to time based on a change in at least one of: the ethnographic data, the demographic data associated with the user, the buying behavioral data associated with the user, the social networking data associated with the user, at least a selection of the recommendation by the user from the personalized recommendations, any combination thereof.

At block 804, the persona, the activity information (i.e., evolved using at least one a historical real-time activity of the user, if any) and the constraints are processed or analyzed.

At block 806, the data is processed to generate a selectable ranked set of the personalized recommendations. Some examples of the personalized recommendations may include such as a route, a store, at least an item to be shopped or a combination thereof. Here, the selectable ranked set of the recommendations may be top 10, top 100 recommendations and so on.

At block 808, the selectable ranked set of the personalized recommendations are displayed within a window of a user interface (i.e., mobile device of the user). Once the recommendations are displayed to the user, the user may choose any recommendation to buy an item, or the like and provide feedback to the system.

Finally, the user provides feedback to the provided recommendations and the feedback is received by the recommendation system to further evolve the persona of the user.

The present disclosure provides methods and systems for enhancing user shopping experience in physical stores and the primary purpose is to maximize value for money. The disclosure enables retailers or store owners to develop better understanding of their consumer base and accordingly provide them with a more fulfilling shopping experience. The disclosure further assists shoppers by providing relevant recommendations based on persona, and constraints of the shoppers. Moreover, the disclosure provides different recommendations to different users having similar persona and/or constraint information. Additionally, the disclosure uses machine learning algorithms to automate the recommendation process.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "generating," or "monitoring," or "displaying," or "tracking," or "identifying," "or receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A system for presenting personalized shopping related recommendations to one or more users, the shopping recommendations related to one or more physical stores, the system comprising:
    a processor; and
    a memory coupled to the processor for executing a plurality of modules present in the memory, the plurality of modules comprising:
        a receiving module configured to receive:
            one or more items to buy and at least one constraint associated with the user, the at least one constraint being specified by the user in real-time;
            at least one persona associated with the user; and
            at least one activity associated with the user in one or more physical stores, the at least one activity being tracked using one or more smart devices, wherein the one or more smart devices comprise at least one of:
            a sensor installed in the one or more physical stores, and
            a combination of a smartphone, comprising a camera, and a wearable device;
        a persona learning module configured to:
            generate the at least one persona based on at least one of: ethnographic data obtained from the user, demographic data associated with the user, buying behavioral data associated with the user, and social networking data associated with the user;
            classify the user into a pre-defined personal bucket; and
            represent the at least one persona in a form of a matrix representation;
        a recommendation engine configured to:
            process the at least one constraint, the at least one persona, and the at least one activity, and to generate a selectable ranked set of the personalized recommendations for the user; and
        a user interface unit configured to:
            generate the selectable ranked set of the personalized recommendations to be displayed to the user for a subsequent action.

2. The system of claim 1, wherein the personalized recommendations comprise at least one of: the one or more physical stores, a route to the one or more physical stores, details of the one or more physical stores for shopping, and at least an item to be shopped in the one or more physical stores.

3. The system of claim 1, wherein the persona learning module further comprises:
    an evolving persona module configured to update the matrix representation associated with the user based on change in at least one of: the ethnographic data obtained from the user, the demographic data associated with the user, the buying behavioral data associated with the user, the social networking data associated with the user, and at least one recommendation selected by the user from the personalized recommendations.

4. The system of claim 1, wherein the user specified constraint comprises at least one of: a time constraint, a budget constraint, a distance constraint, a one more items to buy constraint, and a location constraint.

5. The system of claim 1, wherein the user provides feedback on the personalized recommendations.

6. The system of claim 1, wherein the receiving module is configured to receive a query from the user, the query including details of one or more items to be purchased by the user.

7. An apparatus comprising:
    one or more non-transitory computer-readable media storing a persona learning unit, a data collection unit, and a recommendation engine;
    the persona learning unit being configured to:
        receive one or more of ethnographic data related to a user, demographic data associated with the user, behavioral data associated with the user, and social networking data associated with the user;
        generate one or more personas of the user based on one or more of: ethnographic data related to the user, the demographic data associated with the user, the behavioral data associated with the user, and the social networking data associated with the user; and
        classify the user into a predefined personal bucket and represent the persona in a form of a matrix representation,
    the data collection unit being configured to obtain the one or more personas associated with the user, the one or more constraints associated with the user, and activity data of the user, the activity data being sensed using one or more smart devices, wherein the one or more smart devices comprise at least one of:
        a sensor installed in one or more physical stores, and
        a combination of a smartphone, comprising a camera, a wearable device; and
    the recommendation engine being configured to:
        process the one or more personas of the user, the one or more constraints associated with the user, and the activity data of the user, to generate a pre-defined number of personalized recommendations for the user; and
        send a notification of the personalized recommendations to the user.

8. The apparatus of claim 7, wherein the personalized recommendations comprise one or more of: a physical store for shopping, a route of the store, details of a physical store for shopping, and one or more items to be shopped.

9. The apparatus of claim 7, wherein the data collection unit is further configured to: update the matrix representation associated with the user based on change in one or more of: the ethnographic data related to the user, the demographic data associated with the user, the buying behavioral data associated with the user, the social networking data associated with the user, and a recommendation selected by the user from the personalized recommendations.

10. The apparatus of claim 7, wherein the one or more constraints associated with the user comprise: a time constraint, a budget constraint, a distance constraint, one or more items to buy constraint, and a location constraint.

11. The apparatus of claim 7, wherein the recommendation engine is configured to receive feedback from the user about the personalized recommendations.

12. A method for assisting users by presenting recommendations for shopping at physical stores, the method comprising:
   receiving at least one persona associated with a user based on one or more of: ethnographic data obtained from the user, demographic data associated with the user, buying behavioral data associated with the user, social networking data associated with the user, and one or more historical activities of the user inside one or more physical stores, wherein the one or more historical activities are sensed using at least one of:
   a sensor installed in the one or more physical stores, and
   a combination of a smartphone, comprising a camera, and a wearable device;
   receiving one or more constraints associated with the user, the constraints being specified by the user and including one or more of: a time constraint, a budget constraint, a distance constraint, an item to buy constraint, and a location constraint;
   analyzing the at least one persona, the one or more constraints, and the one or more historical activities, to generate a pre-defined number of personalized recommendations; and
   generating a graphical user interface for displaying the personalized recommendations to the user.

13. The method of claim 12 further comprising:
   generating the at least one persona based on the ethnographic data obtained from a user, the demographic data associated with the user, the buying behavioral data associated with the user, and the social networking data associated with the user, and the one or more historical activities of the user inside the one or more physical stores;
   classifying the user into the persona selected from at least one pre-defined category of persona buckets and representing the persona in a form of a matrix representation; and
   updating the matrix representation associated with the user based on change in at least one of: the ethnographic data related to the user, the demographic data associated with the user, the buying behavioral data associated with the user, the social networking data associated with the user, and a recommendation selected by the user from the personalized recommendations.

14. The method of claim 12 further comprising receiving a query from the user.

15. The method of claim 12 further comprising transmitting the personalized recommendations to the user.

16. The method of claim 12, wherein the personalized recommendations are selectable by the user.

* * * * *